United States Patent [19]

Shiozawa

[11] Patent Number: 5,015,893

[45] Date of Patent: * May 14, 1991

[54] MOTOR STRUCTURE WITH MAGNETIC INTERFERENCE SHIELD

[75] Inventor: Shinichi Shiozawa, Nagano, Japan

[73] Assignee: Yugen Kaisha Chubuseimitsu, Nagano, Japan

[*] Notice: The portion of the term of this patent subsequent to Jul. 24, 2007 has been disclaimed.

[21] Appl. No.: 494,068

[22] Filed: Mar. 15, 1990

Related U.S. Application Data

[63] Continuation-in-part of Ser. No. 369,990, Jun. 22, 1989, Pat. No. 4,943,748.

[30] Foreign Application Priority Data

Jul. 16, 1988 [JP] Japan ................... 63-176245

[51] Int. Cl.$^5$ ............ H02K 11/00; H02K 21/24; G11B 5/12
[52] U.S. Cl. ................ 310/67 R; 310/85; 360/98.07
[58] Field of Search .......... 310/67 R, 256, 85, 104; 360/98.06, 98.07, 99.08

[56] References Cited

U.S. PATENT DOCUMENTS

| 4,629,919 | 12/1986 | Merkle | 310/67 R |
| 4,647,803 | 3/1987 | von der Heide et al. | 310/67 R |
| 4,661,735 | 4/1987 | Miki et al. | 310/85 |
| 4,672,250 | 6/1987 | Seitz | 310/67 R |
| 4,943,781 | 7/1990 | Shiozawa | 310/67 R |

Primary Examiner—Steven L. Stephan
Assistant Examiner—D. L. Rebsch
Attorney, Agent, or Firm—Jordan and Hamburg

[57] ABSTRACT

A motor structure for driving discs includes a motor having a frame wall and a hollow holding cylinder extending generally perpendicular from the frame wall, a rotor shaft coaxially disposed in the hollow holding cylinder, and bearings mounted on the hollow holding cylinder for rotatably supporting the rotor shaft. The holding cylinder has an outer part, and a coil is mounted on the outer part. A cup-shaped rotor is mounted on the rotor shaft, the cup-shaped rotor having an end wall, a first cylinder portion extending coaxially from the end wall, and a second cylindrical portion juxtaposed to the first cylindrical portion. The first cylindrical portion has a diameter which is less than the diameter of the second cylindrical portion, the coil being generally axially aligned with and being disposed radially inwardly of the second cylindrical portion. A magnet is mounted on the second cylindrical portion radially outwardly of the coil, and a shield is mounted on the rotor and extends radially inwardly of the first cylindrical portion for shielding the discs from the magnetic field of the motor.

18 Claims, 3 Drawing Sheets

MOTOR STRUCTURE WITH MAGNETIC INTERFERENCE SHIELD

This is a continuation-in-part application of U.S. Ser. No 369,990, filed June 22, 1989, now U.S. Pat. No. 4,943,748.

FIELD OF THE INVENTION AND STATEMENT OF THE RELATED ART

The present invention relates to a motor structure used in a disc drive motor or the like, for a magnetic recording apparatus or an optical recording apparatus.

FIG. 2 shows an example of a known disc drive motor. In this motor, the base part of a disc mounting section 241 in a cup-shaped rotor 24 made of magnetic material is rotatably fitted through a bearing 23 on the upper part of a shaft 22 which is planted upright on a frame 21 integrally therewith, and further a flange-like disc abutting part 242 is formed on the outer periphery of the lower end of the disc mounting section 241. Further, a drive coil 26 is wound around a core 25 fitted on the shaft 22 within the disc mounting section 241, and a magnet 27 is fitted on the inner peripheral surface of the disc mounting section 241 outside of and adjacent to the coil. Further, in FIG. 2, there are shown a disc 28 mounted on the disc mounting section 241, a sensor 29 and a terminal board 30.

With the motor having the above-mentioned structure, since the rotor 24 is fitted on the shaft 22, indirectly through the bearing 23, that is, it does not make contact with the shaft, static electricity produced in the disc mounting section 241 cannot be discharged, and accordingly, a high voltage is induced between the disc mounting section and the shaft, causing electric erosion in the raceway surface of the bearing 23, resulting in excessive shaft deflection resulting in a problem of generation of noise. Further, since the magnet 27 is fitted directly on the disc mounting section, the rotor should be made of magnetic materials, and accordingly, a difficult cutting process must be used for remedying shaft deflection because a correcting process in which the outer surface of an attaching surface or an abutting part is ground in order to reduce shaft deflection after the assembly of the motor so as to decrease the deflection of the disc mounting section 241 and the abutting part 242 in the motor, is difficult if the rotor made of magnetic materials is used.

Further, if the rotor is made of magnetic materials, rust preventing treatment should be taken. After a correcting process for decreasing the deflection, the rust preventing treatment should be repeated for the thus processed or ground parts, and such a correcting process is therefore cumbersome.

For example, Japanese Laid-Open Patent Nos. 61-112544 and 63-107438 disclose motors solving the above-mentioned problems. These motors have substantially the same structure, and therefore, the motor disclosed in Japanese Laid-Open Patent No. 63-107438 alone will be explained briefly. As shown in FIG. 3, a shaft 32 is rotatably fitted through the intermediary of bearings 33 in the center axial part of a holding cylinder 311 planted upright on a motor frame 31, and the base part of a disc mounting section 341 of a cut-shaped rotor 34 having its lower end opened, is fitted on the upper end part of the shaft which is projected from the holding cylinder, integrally therewith. Further, a drive coil 36 is wound on a core 35 fitted on the outer peripheral part of the holding cylinder 311, and a magnet 37 is fitted in the inner peripheral surface of a disc mounting section 341 through the intermediary of a magnet yoke 41 outside of the core with a gap therebetween. Further, in FIG. 3 there are shown a sensor 39 and a terminal board 40.

In this example of the motor, since the rotor makes contact with the shaft, it is possible to solve the first mentioned disadvantage caused by static electricity inherent to the motor. However, since the bearings are located inside of the core surrounded by the disc mounting section, the diametrical dimensions of the bearings are inevitably small, and accordingly, there is a disadvantage such that detrimental effects are imposed upon the use life, impact resistance and vibration resistance of the bearing. Further, since the magnet is fitted in the inside of the disc mounting section, the diametrical dimension of the magnetic are also inevitably small, and accordingly, there is a further disadvantage such that detrimental effects are imposed upon the characteristics of the motor, such as the motor generation torque characteristic and the like. Object and Summary of the Invention An object of the present invention is to enable a shaft to be supported by use of a large bearing.

Another object of the present invention is to ensure a long use life, a high wear resistance and a high impact resistance for bearings. Further object of the present invention is to propose a motor structure which can use a magnet having large diametrical dimensions. Moreover, further object of the present invention is to enhance the characteristics of a motor such as the motor generation torque characteristic.

According to the present invention, there is provided a motor structure including a frame, a shaft a bearing rotatably supporting the shaft in the frame, a core arranged outside of the shaft, a rotor having one end opened and arranged outside of the rotor, and a magnet fitted inside of a magnet mounting section formed in the rotor. The rotor body of the above-mentioned rotor is mounted on the above-mentioned shaft in a unit structure, and the above-mentioned magnet mounting section is bulged out from the opened end of the rotor body while the above-mentioned magnet is fitted inside of the magnet mounting section, facing the above-mentioned shaft.

The features of the present invention will become more apparent when the present invention is explained with reference to the drawings which are:

DESCRIPTION OF THE PREFERRED EMBODIMENTS

Figure 1:
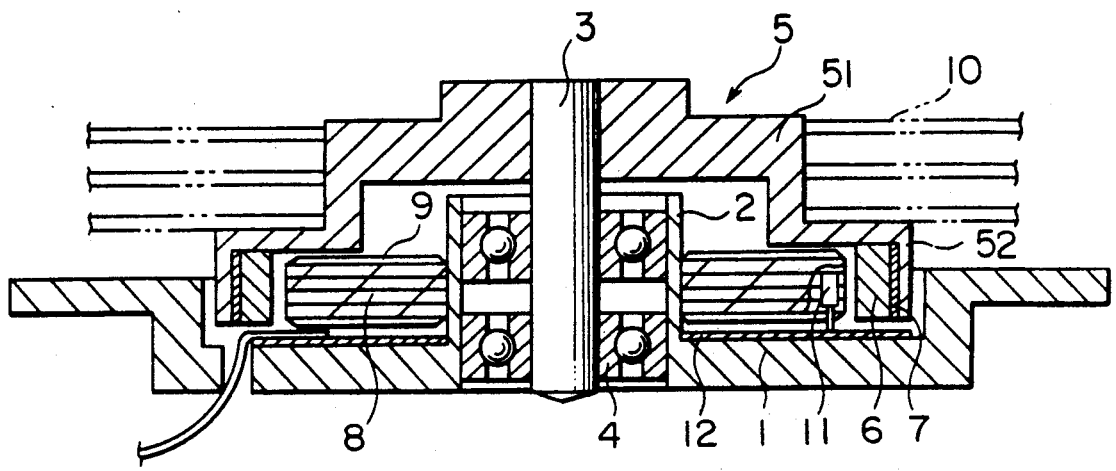
FIG. 1 is a cross-sectional view illustrating one embodiment of the present invention.
Figure 2:
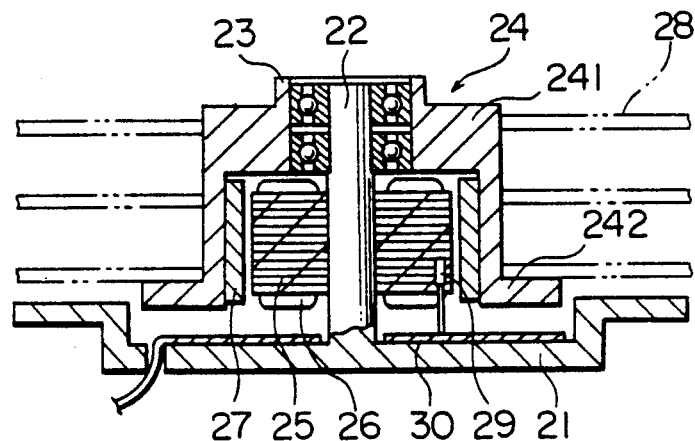
FIGS. 2 and 3 are cross-sectional views illustrating already proposed motors relevant to the present invention, respectively.
Figure 3:
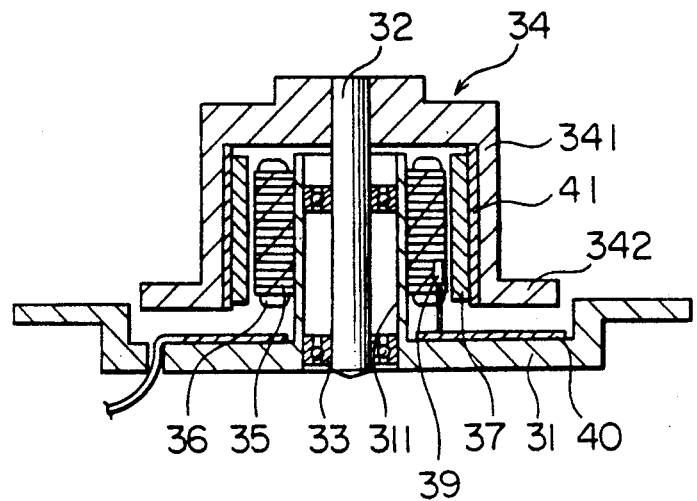

The present invention will be hereinbelow detailed in an embodiment form which is applied on a drive motor structure in a disc recording apparatus with reference to FIG. 1.

A holding cylinder 2 is planted upright on a motor frame 1, integrally therewith. A shaft 3 is fitted rotatably in bearings 4 in a center axial part inside of the holding cylinder 2, the upper end part of the shaft being projected upward from the holding cylinder 2. The base part of a disc mounting section 51 constituting the body of a cup-shaped rotor 5 is fitted on the upper end part of the shaft 3 integrally therewith. The rotor 5 has an opened part facing downward. The lower end part of the disc mounting section 51 is bulged out so as to form a magnet mounting section 52 having an L-like cross-sectioned shape, and a magnet 6 is fitted in the inner peripheral surface of the magnet mounting section 52 through the intermediary of a magnet yoke 7, facing the shaft 3.

Further, a core 8 is fitted on the outer peripheral part of the above-mentioned holding cylinder 2, and a drive coil 9 is wound on the core 8, facing, at its outside, the above-mentioned magnet 6 with a gap therebetween.

Further, in FIG. 1, there are shown discs 10 mounted on the disc mounting section 51 of the rotor, a sensor 11 and a terminal board 12.

In view of the foregoing arrangement according to the present invention, since the magnet mounting section 52 is bulged out outside of the rotor body 51 while the core 8 and the bearings are disposed in the space surrounded by the magnet mounting section 52, it is possible to use large size bearings, and accordingly, it is possible to ensure a long use life, a high wear-resistance and a high impact resistance for the bearings. Further, since the magnet 6 is mounted in the magnet mounting section 52, facing the shaft 3, a magnet having large diametrical dimensions can be used, and accordingly, it is possible to enhance the motor characteristics such as a motor generation torque characteristic.

In the above-mentioned embodiment, since the magnet 6 is mounted in the magnet mounting section 52 through the intermediary of the magnet yoke 7, there is an advantage such that a material having a suitable machinability can be selected for the rotor. It is natural that the magnet 6 may be fitted directly in the rotor 5 with no attaching member 7 therebetween. However, in this case, the rotor should be made of magnetic materials.

The present invention will now be described with reference to the embodiments of FIGS. 4–7, in which like numerals have been used as regards the corresponding parts in the prior embodiments.

Figure 4:
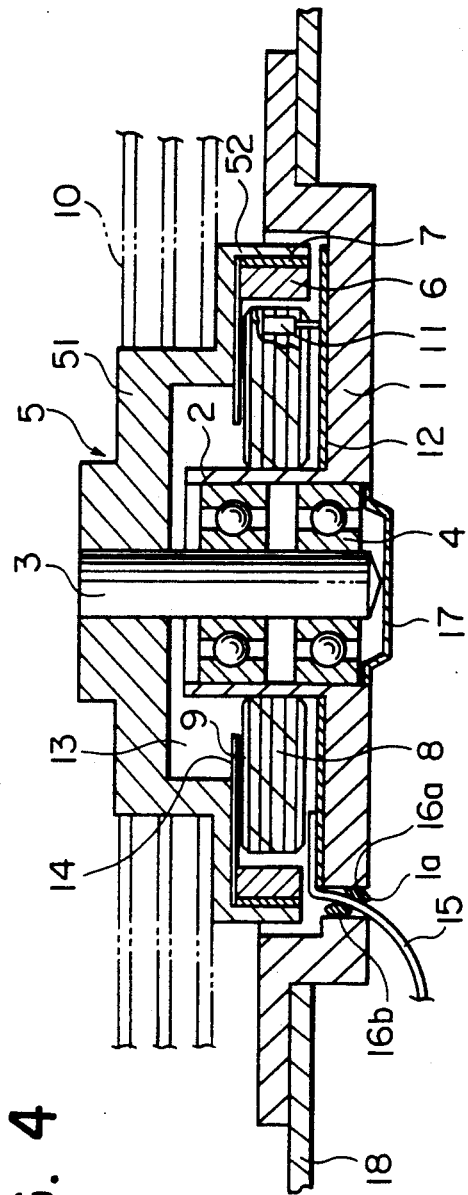
FIG. 4 is a cross-sectional view showing another embodiment.

In the embodiment of FIG. 4, a magnetic shield plate 14 is mounted in a horizontal disposition of the inner surface of the rotor body 51. The outer end of the magnetic shield plate 14 extends into the chamber 13. A lead line 15 passes outwardly through a hole 1a in the frame 1. The hole 1a is sealed by sealing materials 16a and 16b. The lower portion of the bearing space is covered with a sealing cover 17. The frame 1 is attached to a base 18 to thereby mount the motor thereon.

The magnetic shield plate 14 protects the magnetic disc 10 from the magnetic field leaked from the permanent magnet 6.

The sealing materials 16a and 16b and the sealing cover 17 prevent dirt particles from entering the inner side of the frame 1 to the disc 10.

Figure 5:
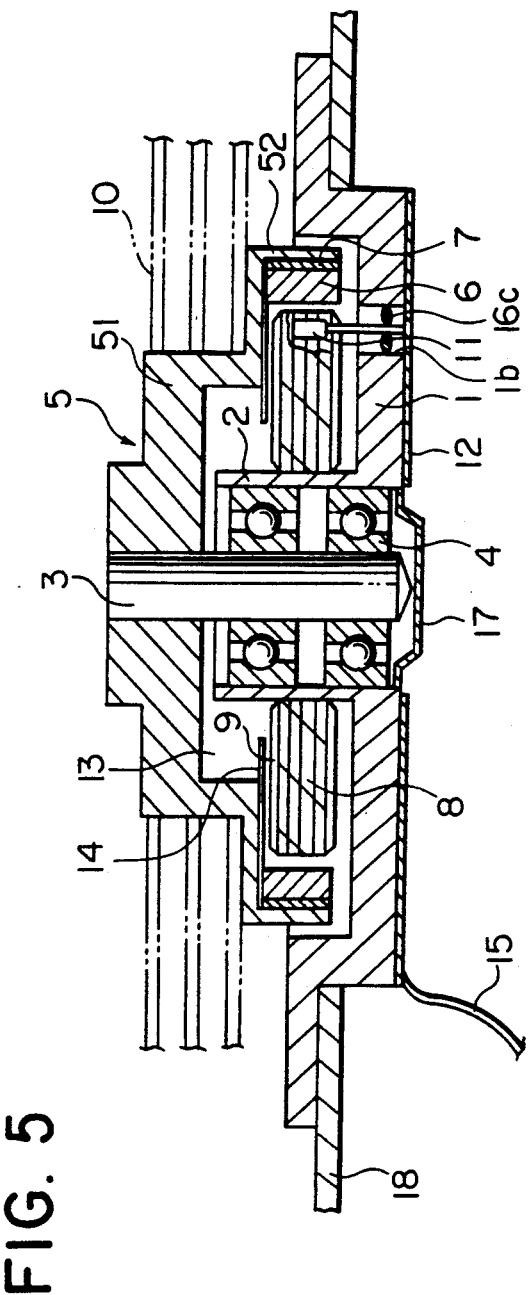
FIG. 5 is a cross-sectional view showing a further embodiment.

In the FIG. 5 embodiment, the terminal board 12 is mounted on the lower surface of the frame 1, and the lead line 15 is connected to the terminal board 12. The legs of the sensor 11 in the rotor 5 are connected to the terminal board 12 through a hole 1b in the frame 1. The hole 1b is sealed by the sealing material 16c.

Figure 6:
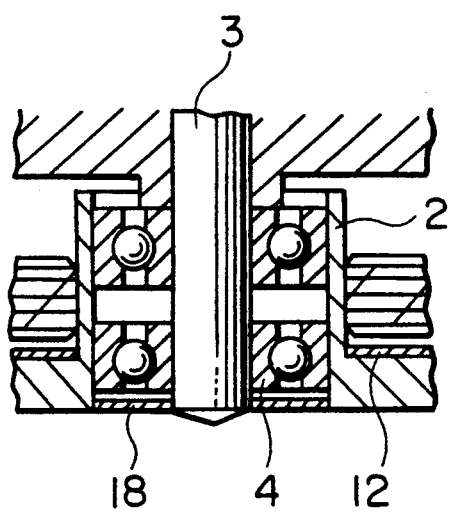
FIG. 6 is a partial sectional view showing an alternate holding cylinder.
Figure 7:
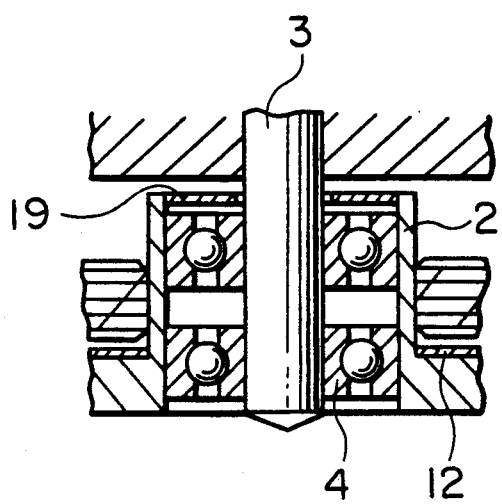
FIG. 7 is a partial sectional view showing a further alternate cylinder.

FIGS. 6 and 7 show means for sealing the bearing 4 in place of the above-mentioned sealing cover 17. In FIGS. 6 and 7, the seals 18 and 19 are fixed to the holding cylinder 2. The seals 18 and 19 are in contact with the shaft. However, there may not be such contact and the space between the shaft 3 and the seals 18, 19 may be sealed by a seal material such as a ferro fluidics material.

The seal 19 shown in FIG. 7 is mounted on the upper side of the cylinder 2, and therefore grease in the bearings is prevented from passing to the disc 10. Because it is difficult to reduce the height of the rotor body 51 by use of the seal 19, the sealing method of FIG. 6 facilitates the minimization of the rotor 5 in comparison with the sealing method using the seal 19 in FIG. 7.

In the embodiments of FIGS. 4 and 5, since there are no sensors or the like within the chamber 13, the diameter of the rotor body 51 can be reduced. This chamber may be reduced such that the rotor body 51 does not touch the cylinder 2. At the same time, the height of the rotor body 51 may also be reduced.

Therefore, according to the present invention, the rotor may have a minimized thickness, and it is thereby possible to minimize the disc 10.

Since in the embodiments of FIGS. 4 and 5 there is no sensor or the like within the chamber 13, it is possible to mount the magnetic shielding plate 41 in the chamber as a means for protecting the disc 10 from the magnetic flux leaked from the permanent magnet 6, thereby avoiding a complex construction of the rotor.

In the embodiment of FIG. 5, since the terminal board 12 is attached to the lower surface of the frame 1, the following advantages can be obtained. In the FIG. 5 embodiment, it is not necessary to pass the lead lines 15 from the rotor 5 to the outside of the frame 1, and therefore it is not necessary to seal them by using the sealing material 16a and 16b. As mentioned above, it is difficult to completely seal the hole by using seal material because there are many lead lines and the cross section of each lead line is a circle.

In the embodiment of FIG. 4, it is necessary to inject the sealing material 16a and 16b both to innerside and outside of the frame 1. In the embodiment of FIG. 5, the sealing material 16c may be injected only from the outside of the frame 1, and therefore it is not necessary to inject from both sides, thereby simplifying the sealing operation.

Although the present invention has been described in specific terms, it should be noted here that the described embodiments are not necessarily exclusive and that various changes and modifications may be imparted thereto without departing from the scope of the invention, which is limited solely by the appended claims.

What I claim is:

1. A motor structure for driving discs comprising a motor means having a frame wall and a hollow holding cylinder extending generally perpendicular from said frame wall, a rotor shaft coaxially disposed in said hollow holding cylinder, bearing means mounted on said hollow holding cylinder for rotatably supporting said rotor shaft, said holding cylinder having an outer part, coil means mounted on said outer part of said holding cylinder, a cup-shaped rotor means mounted on said rotor shaft, said cup-shaped rotor means having an end wall, a first cylindrical portion extending coaxially from said end wall, and a second cylindrical portion juxtaposed to said first cylindrical portion, said first cylindrical portion having a diameter which is less than the diameter of said second cylindrical portion, said coil means being generally axially aligned with and being disposed radially inwardly of said second cylindrical portion, magnet means mounted on said second cylindrical portion radially outwardly of said coil means, and shield means mounted on said rotor means and extending radially inwardly of said first cylindrical portion for shielding said discs from the magnetic field of said motor means.

2. A motor structure according to claim 1, wherein said shield means overlies said magnet means.

3. A motor structure according to claim 1, wherein said coil means has an outer radial portion, said shield means overlying said outer radial portion of said coil means.

4. A motor structure according to claim 1, wherein said shield means extends radially outwardly to overlie said second cylindrical portion of said rotor means.

5. A motor structure according to claim 1, further comprising a terminal board means disposed on said frame wall between said coil means and said frame wall.

6. A motor structure according to claim 1, further comprising terminal board means disposed on the outside of said frame wall.

7. A motor structure according to claim 6, wherein said frame wall has means defining an opening, and connecting means between said coil means and said opening, said connecting means passing through said opening.

8. A motor structure according to claim 7, further comprising sealing means sealing said connecting means in said opening.

9. A motor structure according to claim 7, wherein said connecting means comprises a sensor and legs extending from said sensor, said legs passing through said opening.

10. A motor structure according to claim 1, wherein said holding cylinder has one end juxtaposed to said end wall of said rotor means and an opposite end, and seal means mounted on one of said ends of said holding cylinder.

11. A motor structure according to claim 10, wherein said seal means is mounted on said one end of said holding cylinder.

12. A motor structure according to claim 10, wherein said seal means is mounted on said opposite end of said holding cylinder.

13. A motor structure according to claim 10, wherein said seal means extends radially inwardly to a position juxtaposed to said rotor shaft.

14. A motor structure according to claim 1, wherein said motor structure is a disc drive motor for driving said discs which are mounted on said first cylindrical portion of said cup-shaped rotor means.

15. A motor structure comprising a motor means having a frame wall and a hollow holding cylinder extending generally perpendicular from said frame wall, a rotor shaft coaxially disposed in said hollow holding cylinder, bearing means mounted on said hollow holding cylinder for rotatably supporting said rotor shaft, said holding cylinder having an outer part, coil means mounted on said outer part of said holding cylinder, a cup-shaped rotor means mounted on said rotor shaft, said cup-shaped rotor means having an end wall, a first cylindrical portion extending coaxially from said end wall, an intermediate wall extending radially outwardly from said first cylindrical portion, and a second cylindrical portion extending axially from said intermediate wall such that said first cylindrical portion has a diameter which is less than the diameter of said second cylindrical portion, said coil means being generally axially aligned with and being disposed radially inwardly of said second cylindrical portion, said coil means having an outer diameter greater than the diameter of said first cylindrical portion such that said coil means is generally axially superimposed relative to said first cylindrical portion, magnet means mounted on said second cylindrical portion radially outwardly of said coil means, and shield means mounted on said rotor means and extending radially inwardly of said first cylindrical portion for shielding the magnetic field of said motor means.

16. A motor structure according to claim 15, wherein said shield means is mounted on said intermediate wall.

17. A motor structure according to claim 15, wherein said magnet means is disposed between said intermediate wall of said cup-shaped motor means and said frame wall, said shield means being disposed between said intermediate wall and said magnet means.

18. A motor structure according to claim 15, wherein said shield means underlies said intermediate wall.

* * * * *